United States Patent
Rashid et al.

(10) Patent No.: US 9,615,260 B2
(45) Date of Patent: Apr. 4, 2017

(54) ADAPTIVE QUALITY OF SERVICE FOR WIRELESS NETWORKS

(71) Applicant: Intel Corporation, Santa Clara, CA (US)

(72) Inventors: Mohammad Mamunur Rashid, Hillsboro, OR (US); Satish Chandra Jha, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 14/293,240

(22) Filed: Jun. 2, 2014

(65) Prior Publication Data

US 2015/0350918 A1    Dec. 3, 2015

(51) Int. Cl.
*H04W 4/00* (2009.01)
*H04W 16/14* (2009.01)
*H04W 28/02* (2009.01)
*H04W 72/04* (2009.01)
*H04W 28/24* (2009.01)

(52) U.S. Cl.
CPC ....... *H04W 16/14* (2013.01); *H04W 28/0247* (2013.01); *H04W 72/0406* (2013.01); *H04W 28/24* (2013.01); *H04W 72/042* (2013.01); *H04W 72/0413* (2013.01); *H04W 72/0453* (2013.01)

(58) Field of Classification Search
CPC . H04W 16/14; H04W 28/02; H04W 28/0247; H04W 72/04; H04W 72/0413
USPC .................................................. 370/252, 329
See application file for complete search history.

(56) References Cited

U.S. PATENT DOCUMENTS

2008/0080534 A1* 4/2008 Lee, II ................ H04L 12/2832
                                                                370/401
2009/0131014 A1    5/2009 Mashinsky et al.
2011/0294456 A1* 12/2011 Anderson ............. H04W 28/18
                                                                455/404.1

(Continued)

FOREIGN PATENT DOCUMENTS

KR    1020120060534 A    6/2012
WO    WO-2015187269 A1   12/2015

OTHER PUBLICATIONS

"International Application Serial No. PCT/US2015/028442, International Search Report mailed Jul. 31, 2015", 4 pgs.

(Continued)

*Primary Examiner* — Farah Faroul
(74) *Attorney, Agent, or Firm* — Schwegman Lundberg & Woessner, P.A.

(57) ABSTRACT

A 3GPP LTE protocol enhancement realizes the full benefit of proposed dynamic frequency sharing systems by enhancing current bearer establishment and update provisioning for adaptive Quality of Service (QoS) levels to support Licensed Shared Access (LSA). A User Equipment (UE) comprises a transceiver configured to define an adaptation context, define a default and one or more additional acceptable QoS levels associated with the adaptation context, communicate a request to create or update an adaptive bearer specifying the defined adaptation context and additional acceptable QoS levels, and receive or update spectrum resources for the adaptive bearer. The adaptive bearer may be provisioned according to the communicated request.

19 Claims, 5 Drawing Sheets

(56) References Cited

U.S. PATENT DOCUMENTS

| | | | |
|---|---|---|---|
| 2012/0264396 A1 | 10/2012 | Smith et al. | |
| 2013/0117719 A1* | 5/2013 | Bender | G06F 9/4443 715/866 |
| 2013/0231081 A1* | 9/2013 | Mo | H04L 41/5067 455/405 |
| 2013/0273958 A1 | 10/2013 | Srikanteswara et al. | |
| 2014/0011509 A1* | 1/2014 | Markwart | H04W 72/082 455/452.1 |
| 2014/0256343 A1* | 9/2014 | Shaikh | H04W 28/22 455/452.2 |
| 2014/0256345 A1* | 9/2014 | Arefi | H04W 16/14 455/454 |
| 2015/0085664 A1* | 3/2015 | Sachdev | H04W 28/0215 370/236 |
| 2015/0334717 A1* | 11/2015 | Rashid | H04W 72/0493 370/329 |

OTHER PUBLICATIONS

"International Application Serial No. PCT/US2015/028442, Written Opinion mailed Jul. 31, 2015", 6 pgs.
Buddhikot, Milind M, et al., "DIMSUMNet: New Directions in Wireless Networking Using Coordinated Dynamic Spectrum Access", World of Wireless Mobile and Multimedia Networks 2005, Sixth IEEE International Symposium, (Jun. 13-16, 2005), 78-85.

* cited by examiner

ADAPTIVE QUALITY OF SERVICE FOR WIRELESS NETWORKS

TECHNICAL FIELD

Examples generally relate to Long Term Evolution (LTE) networks. One or more examples relate to the implementation of Licensed Shared Access (LSA) in LTE networks.

BACKGROUND

Wireless communication systems are widely deployed to provide various types of communication content such as voice, data, and other media. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems. All multiple access wireless communication systems require sufficient access to available radio spectrum for supporting bearer service requirements.

Licensed Shared Access (LSA) is a new innovative framework that enables more efficient usage of available spectrum by allowing coordinated shared access to licensed spectrum for addressing spectrum shortage. Currently, there is no protocol provided in the 3GPP LTE standard for an adaptive Quality of Service QoS. Thus, in order to realize the full benefit of proposed dynamic frequency sharing systems, there is now a need for enhancements to enable flexible levels of QoS in a 3GPP LTE standard during LSA handoff of users to Primary LTE frequency bands.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
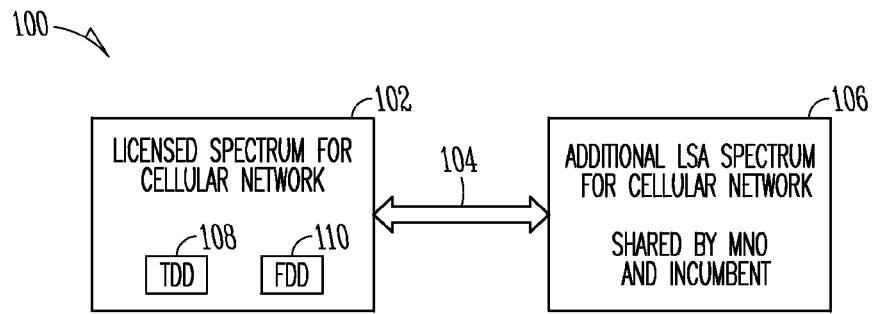
FIG. 1 shows a high level block diagram illustrating and example of dynamic frequency sharing in a cellular network, according to some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "User Equipment" (UE) as used herein refers to a wireless communication device such as a cellular telephone, smartphone, tablet, netbook, wireless terminal, laptop computer, femtocell, High Data Rate (HDR) subscriber station, access point, access terminal, or other personal communication system (PCS) device. The device may be either mobile or stationary.

The term "access point" as used herein may be a fixed station. An access point may also be referred to as an access node, a base station or some other similar terminology known in the art. An access terminal may also be called a mobile station, a User Equipment (UE), a wireless communication device or some other similar terminology known in the art.

The terms "relinquish", "release" and "return" are used herein to mean the surrender of LSA spectrum to its incumbent.

Cellular networks, such as LTE, can allow a device to connect to or communicate with other devices. Modern LTE networks can include both large and small cells configured in a Heterogeneous Network (HetNet) configuration. The base stations (e.g., Evolved Node Bs (eNodeBs)) of large and small cells can be configured to operate on different frequency bands. Frequency band(s), i.e., spectrum, adequate for the various types of communication content is required for a base station to connect to, or communicate with, other devices.

Licensed Shared Access (LSA) can significantly enhance the capacity of 3GPP LTE systems by providing a mechanism to extend available spectrum. Currently, a number of LTE compatible spectrum bands (e.g. 100 MHz in 2.3 GHz band, 100+ MHz in 2.6 GHz band) are being considered for LSA application. AN LSA spectrum sharing framework is strongly backed and urgently awaited by major wireless equipment vendors, operators, regulators, government bodies and standardization bodies. In this framework, an incumbent spectrum holder allows coordinated shared access to an unused portion of its licensed spectrum by a group of secondary users (i.e., network operators), such that a large portion of wireless spectrum that otherwise remains unused becomes available to network operators for meeting the ever increasing traffic demand over LTE networks.

In spite of ongoing innovation to extract greater throughput and data rates from the available spectrum, projected traffic growth indicates that mobile broadband operators will no longer be able to meet demand with their fixed licensed spectrum because the pool of available spectrum for licensing is limited and cannot grow with the increasing demand. The LSA framework addresses this limitation by allowing an incumbent user, also known as a Primary Spectrum Holder (PSH), to share coordinated access to an unused portion of its licensed spectrum with a group of secondary spectrum holders (SSH). The PSH however retains exclusive right to the spectrum and can reclaim the spectrum from SSHs. When using the LSA framework to acquire supplemental spectrum, LTE networks are required to adapt to the dynamic nature of the available spectrum by gracefully accommodating spectrum reclamations by PSHs.

An LTE base station E Node B (eNB) releases the LSA band once it is notified of an upcoming reclamation by the PSH. If a short grace period is given, the eNB may complete steps for the spectrum release within that time. One step of this process is to move, or handover, LTE UEs that are connected to their eNBs through the LSA band to the LTE operator's primary LTE band. In LSA enhanced LTE systems, handover of UEs to the operator's licensed primary LTE band upon reclamation of LSA bands by the incumbent may be frequent. After these frequent LSA reclamations, the eNB may be unable to support all of its established bearers at the same QoS levels it had previously provided using the additionally available LSA frequency band resources.

The Quality of Service (QoS) framework in current 3GPP LTE standards is designed for a fixed spectrum access model and is greatly challenged by the dynamically changing spectrum availability associated with LSA. In the current framework, the network is expected to provide a certain fixed level of QoS throughout the lifetime of an established bearer (i.e., voice/data call) once it has been admitted for service. This traditional design is suited for scenarios where the available spectrum during call admission is expected to remain unchanged during the call lifetime, rather than changing dynamically with the frequent allocation and reclamation of additional LSA spectrum resources. As the available LSA spectrum may decrease significantly with short notice, the Evolved Node B (eNB) base stations may be forced to drop many ongoing calls or deprive lower priority calls of any access in order to continue to provide admitted bearers with unchanged QoS levels using the reduced spectrum after LSA spectrum reclamation.

Typical eNB conservation of LSA spectrum to limit this impact often leads to very inefficient usage of spectrum. However, many applications/services supported in LTE networks are adaptive in nature (such as multi-rate video streaming) and can be supported at multiple QoS levels. Therefore, support for adaptive multi-level QoS is needed in LTE networks deploying LSA because the applications/ services will get their most preferred level of QoS when enough spectrum is available. The network can also gracefully adapt the QoS to supportable levels and minimize the need for dropping or limiting access entirely for low priority calls when spectrum availability is reduced. Applications also benefit from adaptive QoS levels by gaining a higher probability of admission and call continuity, as well as predictable adjustment to their QoS.

The current 3GPP LTE specification does not provide signaling and protocol support for adaptive multi-level QoS. Therefore, there is a need for methodologies by which adaptive QoS support can be incorporated into the LTE QoS framework to address QoS provisioning challenges introduced by LSA in LTE networks.

Adaptive Quality of Service for Wireless Networks enhances the current 3GPP LTE QoS framework by incorporating an adaptive QoS model that is well suited for LSA deployment in 3GPP LTE networks. More specifically, an enhancement to the current QoS model to support QoS adaptive dedicated bearers and network-centric and/or UE-initiated provisioning of QoS adaptive bearers that allows LTE operators to better optimize the usage of LSA spectrum using added flexibility during admission control and resource allocation is detailed in FIGS. 1-6.

FIG. 1 shows a high level block diagram illustrating an example of dynamic LSA frequency sharing in a cellular network. FIG. 1 depicts an example of a system 100 that comprises a primary (legacy) LTE band 102 receiving spectrum from or returning spectrum to, at arrow 104, additional LSA frequency band 106. The primary LTE band 102 may include a Time Division Duplexing (TDD) band 108 or a Frequency Division Duplexing (FDD) band 110. The additional spectrum from the additional LSA frequency band 106 may also be TDD or FDD bands.

Figure 2:
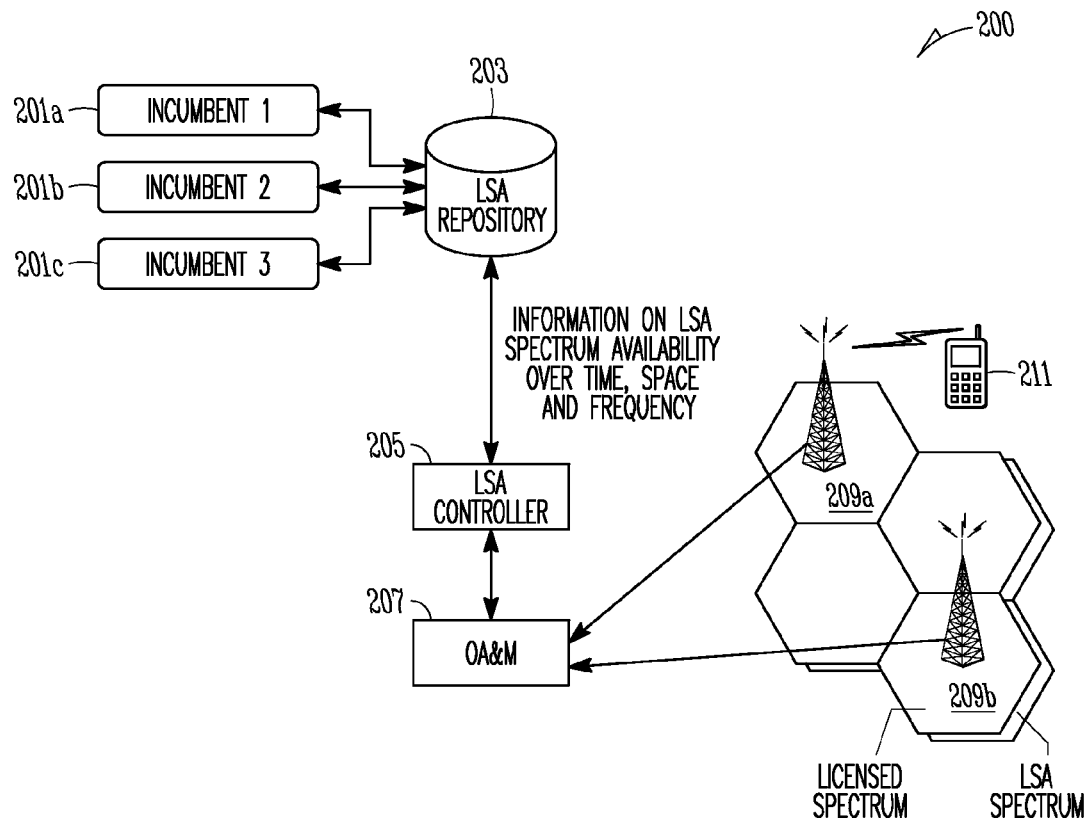
FIG. 2 shows a high level diagram illustrating an exemplary LSA system, according to some embodiments.

FIG. 2 shows a high level diagram illustrating an exemplary traditional Licensed Shared Access (LSA) system 200. In a traditional LSA system, incumbents 201a-c are original spectrum owners. An LSA Repository 203 is a data base containing information on spectrum availability and shorter term aspects of spectrum sharing. The LSA Repository 203 is communicatively coupled to an LSA controller 205, which performs information management and translates LSA Repository 203 data base contents into spectrum access conditions for LSA frequency licensees, while an Operator Administration and Management (OA&M) 207 provides operations, administration, and management for the network operator's network. The OA&M 207 manages limited short term additional spectrum for the network operator's eNBs, or base stations, 209a-b serving User Equipment(s) 211.

Figure 3:
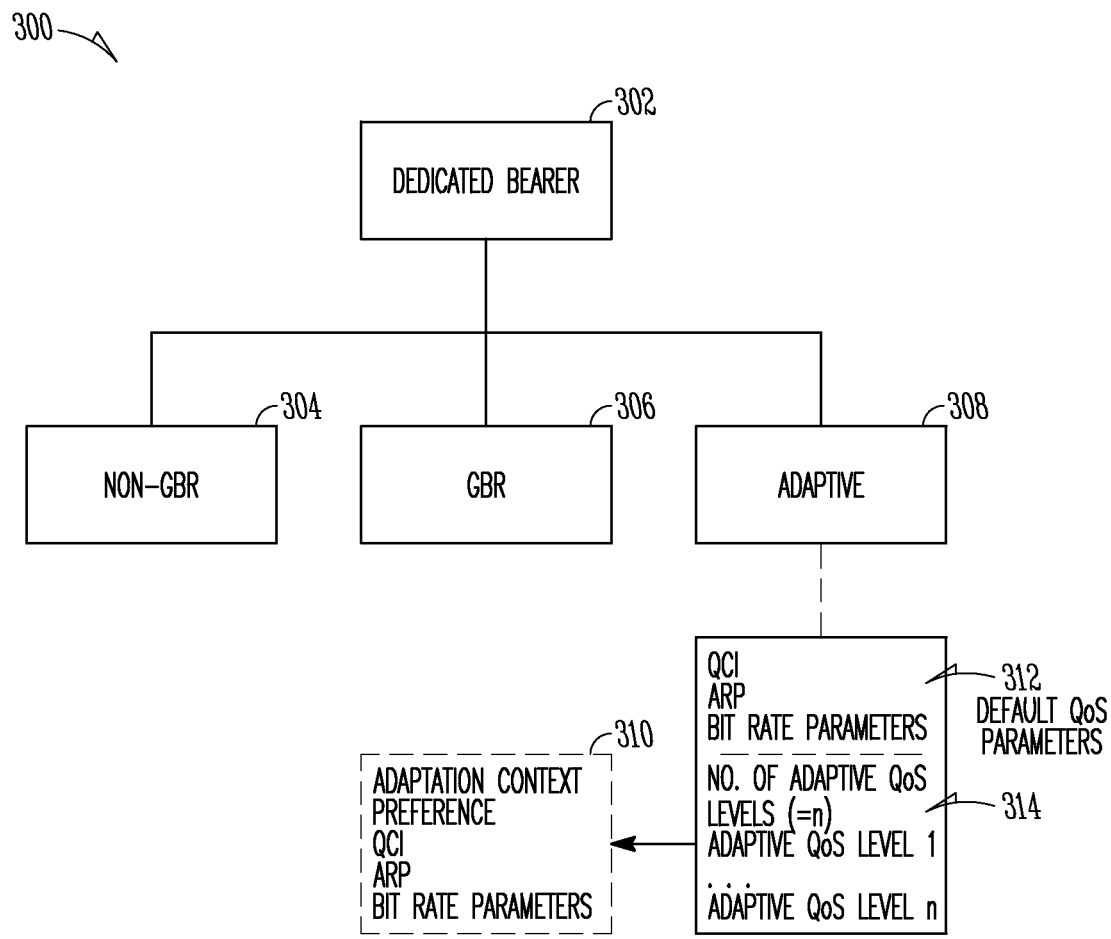
FIG. 3 is a high level overview block diagram of Adaptive Quality of Service for Wireless Networks, according to some embodiments.

FIG. 3 is a high level overview block diagram of Adaptive Quality of Service for Wireless Networks 300, according to some embodiments that enhance current LTE QoS models by incorporating adaptive QoS levels. A dedicated bearer 302 channel carries primary data or voice communications. Current LTE QoS models only support either Guaranteed Bit Rate (GBR) bearers 306 or non-GBR bearers 304. The QoS level for a GBR Service Data Flow (SDF) bearer is defined through a combination of parameters such as QoS Class Identifer (QCI), Allocation and Retention Priority (ARP) and guaranteed bit rates for Download (DL) and Upload (UL). Non-GBR SDF bearers, accept only QCI and ARP parameter values. Novel enhancements to this existing QoS framework comprise a new type of dedicated bearer, namely adaptive bearers 308.

Major changes to the existing QoS messaging structure in current 3GPP standards are unnecessary because any dedicated bearer may be regarded as an adaptive bearer by augmenting its QoS parameters with a set of adaptive QoS levels 314. Default QoS parameters 312 define the most desirable QoS level of the bearer, while the adaptive QoS levels 314 are additional QoS levels acceptable to the adaptive bearer 308. Each adaptive level 314 comprises an associated parameter preference and adaptation context 310. The default QoS level parameters 312 remain the most preferred level parameters, while the preference values 310 of the adaptive QoS levels 314 differentiate adaptive bearer 308 desirability within the adaptive bearer's 308 adaptation context. The adaptive bearer's adaptation context represents scenarios wherein the associated QoS level may be applicable. For example, a particular QoS level may be associated with LSA as its adaptation context, applicable only if a serving eNB 209 is LSA capable.

Adaptive bearers 308 may be provisioned as directed by the network core. The Policy and Charging Control (PCC) framework of the Evolved Packet System (EPS) network core in network-centric provisioning defines and stores policies regarding adaptive QoS in order to apply them when requests arrive for bearer establishment/modification. These QoS policies may dictate that adaptive QoS levels may only be applied to certain types of services, or for certain types of subscribers. QoS policies may also define the adaptation contexts, such as LSA, to be associated with the adaptive QoS levels 314.

Adaptive bearers 308 may also be provisioned in response to explicit requests from UEs 211. The UE may use application signaling to indicate additional levels of QoS 314 that the UE 211 is willing to accept for its requested SDF. Application signaling protocols between the UE and the Application Function (AF) may be enhanced to convey this additional acceptable adaptive QoS level 314 information. The AF, in turn, may forward these additional QoS level parameters 310 to a Policy and Charging Rules Function (PCRF). Enhancements to the QoS parameter 310 mapping and rule generation algorithm in PCRF extract these QoS parameters 310 from received AF messages. The PCRF may consider communicated QoS parameters 310 when generating and provisioning PCC rules destined for a Policy and Charging Enforcement Function (PCEF).

In order to utilize the enhanced QoS model, entities in the EPS network core and Evolved Universal Mobile Telecommunications System Terrestrial Radio Access Network (E-UTRAN) communicate the adaptive QoS level parameter information 310 between themselves as needed using an enhanced message structure. For example, the PCRF and PCEF use diameter protocol for communication. The QoS Information Attribute Value Pair (AVP) is used to convey QoS parameters 310 associated with adaptive bearers 308 to be established or modified. The current QoS-Information AVP in 3GPP TS 29.212 is enhanced to incorporate the adaptive QoS model by adding an Adaptive-QoS-Level parameter, shown in bold, to the QoS-Information AVP Header as follows:

QoS-Information::=<AVPHeader:1016>
   [QoS-Class-Identifier]
   [Max-Requested-Bandwidth-UL]
   [Max-Requested-Bandwidth-DL]
   [Guaranteed-Bitrate-UL]
   [Guaranteed-Bitrate-DL]
   [Bearer-Identifier]
   [Allocation-Retention-Priority]
   [APN-Aggregate-Max-Bitrate-UL]
   [APN-Aggregate-Max-Bitrate-DL]
   [Adaptive-QoS-Level]

Likewise, a novel Adaptive-QoS-Level diameter AVP of type "Grouped" conveys information about an adaptive QoS level that may be acceptable to an Internet Protocol-Connectivity Access Network (IP-CAN) bearer as shown in bold below:

Adaptive-QoS-Level::=<AVP Header: XXXX>
   [Adaptation-Context]
   [Preference]
   [QoS-Class-Identifier]
   [Guaranteed-Bitrate-UL]
   [Guaranteed-Bitrate-DL]
   [Allocation-Retention-Priority]
   [AVP] (may be multiple)

The Adaptation-Context AVP may be of type Enumerated. A LICENSED_SHARED_ACCESS (0) value may defined for this AVP to indicate LSA specific scenarios. This list may be expanded as necessary. The preference AVP may be of type Integer.

The PCRF provides to the PCEF, a PCC rule with QoS information containing Adaptive-QoS-Level AVPs, which the PCEF considers while constructing the Create Bearer or Update Bearer messages destined for serving-gateway/mobility management entity (S-GW/MME). In these message exchanges, Bearer Level QoS fields of type "Bearer QoS" convey the QoS parameters. These enhanced 3GPP TS 29.274 Bearer Level QoS fields are detailed in bold below in Table 1.

TABLE 1

| Octets | Bits | | | | | | | |
|---|---|---|---|---|---|---|---|---|
| | 8 | 7 | 6 | 5 | 4 | 3 | 2 | 1 |
| 1 | Type = 80 (decimal) | | | | | | | |
| 2-3 | Length = n | | | | | | | |
| 4 | Spare | | | | | Instance | | |
| 5 | Spare | | PCI | PL | | Spare | | PVI |
| 6 | Label (QCI) | | | | | | | |
| 7 to 11 | Maximum bit rate for uplink | | | | | | | |
| 12 to 16 | Maximum bit rate for downlink | | | | | | | |
| 17 to 21 | Guaranteed bit rate for uplink | | | | | | | |
| 22 to 26 | Guaranteed bit rate for downlink | | | | | | | |
| 27 | Number of Adaptive QoS Levels = N | | | | | | | |
| 28 to z = (27 + 11 * N) | List of Adaptive QoS Levels (present only if N > 0) | | | | | | | |
| z + 1 to (n + 4) | These octet(s) is/are present only if explicitly specified | | | | | | | |

A list of Adaptive QoS Levels will be present if the Number of Adaptive QoS Levels parameter has a value more than zero in Table 1. The list of adaptive QoS Levels comprises groups of octets defined in Table 2.

TABLE 2

| Octets | Bits | | | | | | | |
|---|---|---|---|---|---|---|---|---|
| | 8 | 7 | 6 | 5 | 4 | 3 | 2 | 1 |
| m | Adaptation Context | | | | | | | |
| m + 1 | QCI | | | | | | | |
| m + 2 | Spare | PCI | | PL | | Spare | PVI | ARP |
| m + 3 to m + 6 | Guaranteed bit rate for uplink | | | | | | | |
| m + 7 to m + 10 | Guaranteed bit rate for downlink | | | | | | | |

Continuing the bearer establishment/modification process, communication between the MME and eNB 209 uses an S1 Application Protocol (S1AP). The QoS information is exchanged through the Enhanced Radio Access Bearer (E-RAB) level QoS parameters Information Entity (IE) having enhancements to 3GPP TS 36.413 for supporting an adaptive bearer as shown in bold in Table 3.

TABLE 3

| IE/Group Name | Presence | Range | IE type and reference | Semantics description |
|---|---|---|---|---|
| E-RAB Level QoS Parameters | | | | |
| >QCI | M | | INTEGER (0..255) | QoS Class Identifier defined in TS 23.401 [11]. Coding specified in TS 23.203 [13]. |
| >Allocation and Retention Priority | M | | 9.2.1.60 | |
| >GBR QoS Information | O | | 9.2.1.18 | This IE applies to GBR bearers only and shall be ignored otherwise. |
| >Adaptive QoS Information | O | | 9.2.X.X | This IE applies to bearers that can be supported with adaptive QoS levels |

The Adaptive QoS Information IE describes the QoS parameters for the adaptive QoS levels associated with an adaptive bearer and is defined below in Table 4.

TABLE 4

| IE/Group Name | Presence | Range | IE type and reference | Semantics description |
|---|---|---|---|---|
| Adaptive QoS Levels List | | 1 | | |
| > Adaptive QoS Level IEs | 1 ... <maxnoofQoSLevels> | | | |
| >> Adaptation Context | M | | Enumerated (LSA, ... ) | |
| >> QCI | O | | INTEGER (0 ... 255) | |
| >Allocation and Retention Priority | M | | 9.2.1.60 | |
| >> E-RAB Guaranteed Bit Rate Uplink | M | | Bit Rate 9.2.1.19 | |

As applied to LSA, the eNB uses the QoS requirements communicated by the E-RAB in admission control, E-RAB modification and resource scheduling. An LSA capable serving eNB associated with an E-RAB is provided with the enhanced capability of converting the QoS level provided to adaptive E-RABs so as to support LSA, in contrast to the traditional QoS framework where the eNB is required to allocate spectrum resources based on a single QoS level that is fixed during admission control and must continue to be maintained throughout the lifetime of the bearer.

Many resource management functionalities in LSA capable eNBs are enhanced by Adaptive QoS for Wireless Networks. The eNB may mitigate resource shortages caused by LSA spectrum reclamation by adjusting the QoS of an adaptive E-RAB to one of its associated QoS levels that specify LSA as an adaptation context, whereas if the E-RAB were not adaptive, the eNB might be forced to drop the bearer altogether if there is no spectrum available to provide the QoS level fixed during admission control. An eNB receiving new additional LSA spectrum may prioritize upgrading of the QoS levels for the adaptive E-RABs that it may have previously downgraded due to a past LSA reclamation. An eNB may track current QoS levels provided to the adaptive E-RABs and update its MME whenever it adapts these QoS levels. Additionally, eNB admission control decisions are improved when E-RABs support adaptive QoS levels because the eNB may choose to admit an E-RAB with adaptive QoS flexibility, rather than deciding not to admit a non-adaptive E-RAB at all because its requested QoS level is not supportable when LSA spectrum is reclaimed.

Figure 4:
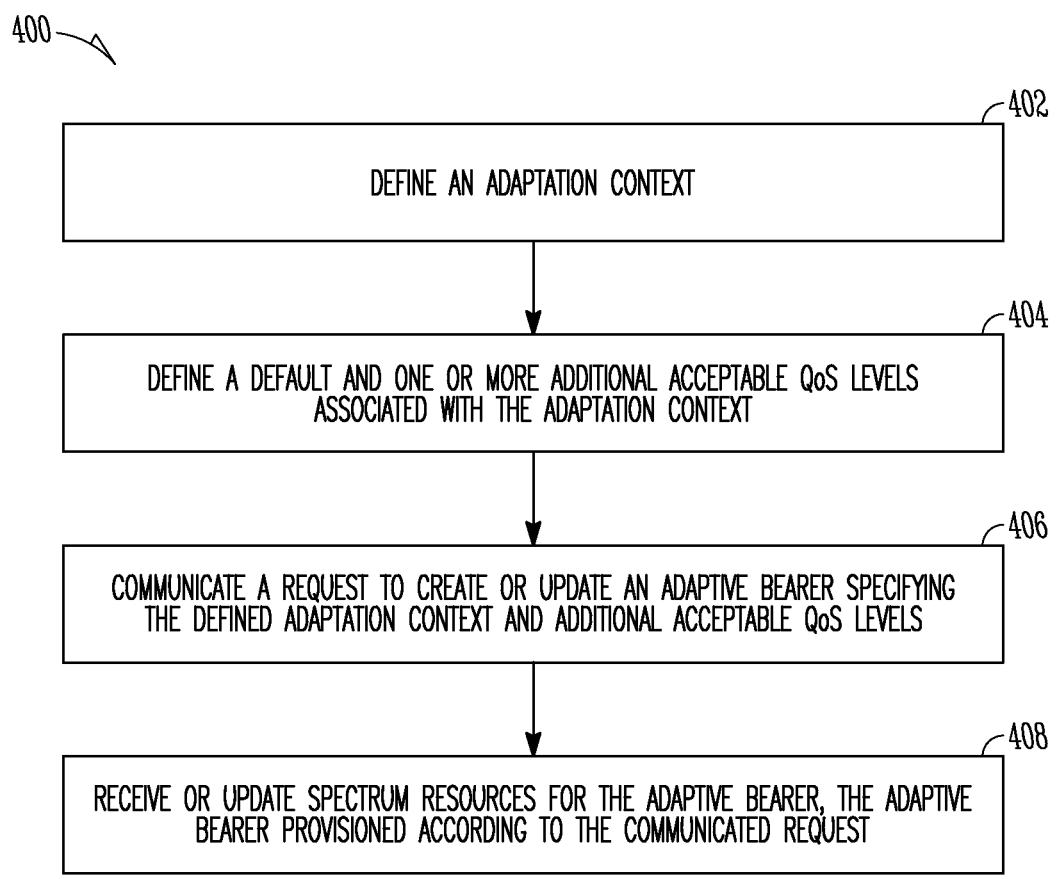
FIG. 4 is a high level overview flow chart illustrating Adaptive Quality of Service for Wireless Networks according to some example embodiments.

FIG. 4 is a high level overview flow chart illustrating a method 400 for Adaptive Quality of Service for Wireless Networks according to an exemplary embodiment. The adaptive QoS process begins in operation 402 by defining an adaptation context. The adaptation context defines applications or services having flexible QoS needs that are amenable to various acceptable QoS levels. In some embodiments, an LSA adaptation context may be defined and associated with acceptable QoS levels when a serving eNB 209 is LSA capable. Control proceeds to operation 404.

In operation 404, a requested default level, and a list of additional acceptable QoS levels are defined. The list of acceptable QoS levels may comprise an adaptation context, preference, QCI, ARP and bit rate parameters. In some embodiments, the list of adaptive QoS Levels comprises groups of octets defined in Table 2. Control proceeds to operation 406.

In operation 406, a request to create or establish an adaptive bearer having the adaptation context and list of acceptable QoS levels defined in operations 402 and 404 respectively is communicated. Spectrum resources for the requested adaptive bearer are then received in operation 408.

Figure 5:
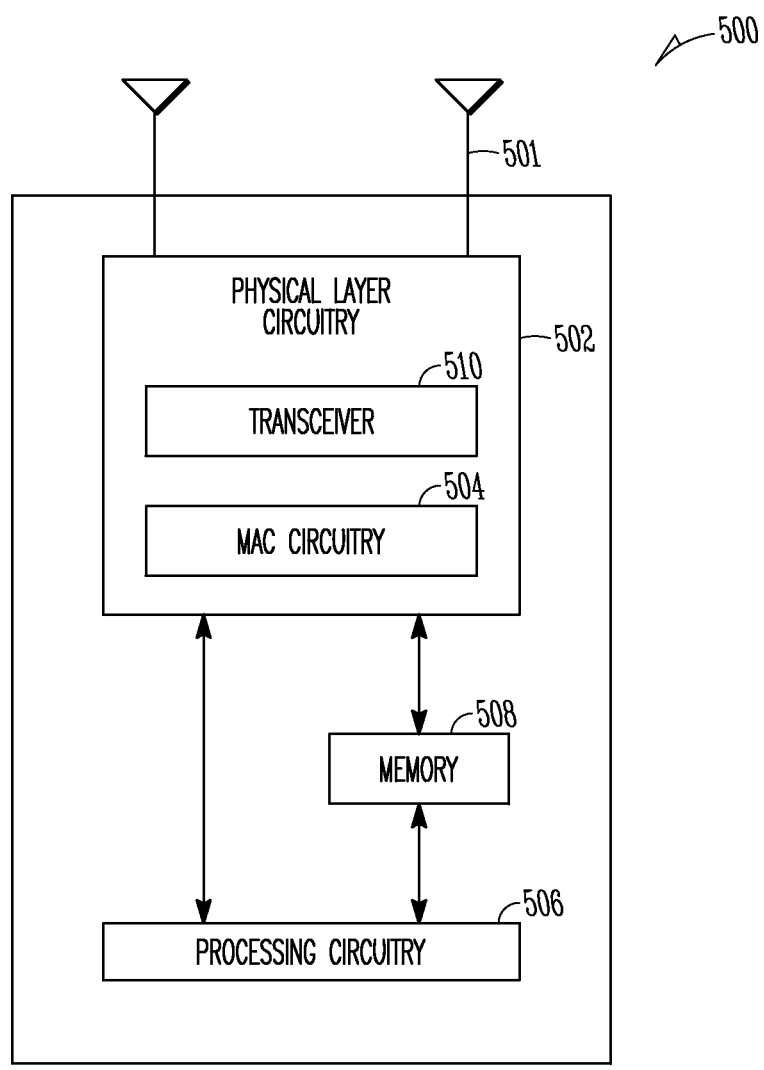
FIG. 5 shows a functional diagram of an exemplary communication station in accordance with some embodiments.

FIG. 5 shows a functional diagram of an exemplary communication station 500 in accordance with some embodiments. In one embodiment, FIG. 5 illustrates a functional block diagram of a communication station that may be suitable for use as an eNB 209 or UE 211 (FIG. 2) in accordance with some embodiments. The communication station 500 may also be suitable for use as a handheld device, mobile device, cellular telephone, smartphone, tablet, netbook, wireless terminal, laptop computer, femtocell, High Data Rate (HDR) subscriber station, access point, access terminal, or other personal communication system (PCS) device.

The communication station 500 may include physical layer circuitry 502 having a transceiver 510 for transmitting and receiving signals to and from other communication stations using one or more antennas 501. The physical layer circuitry 502 may also comprise medium access control (MAC) circuitry 504 for controlling access to the wireless medium. The communication station 500 may also include processing circuitry 506 and memory 508 arranged to perform the operations described herein. In some embodiments, the physical layer circuitry 502 and the processing circuitry 506 may be configured to perform operations detailed in FIGS. 3 and 4.

In accordance with some embodiments, the MAC circuitry 504 may be arranged to contend for a wireless medium and configure frames or packets for communicating over the wireless medium and the physical layer circuitry 502 may be arranged to transmit and receive signals. The physical layer circuitry 502 may include circuitry for modulation/demodulation, upconversion/downconversion, filtering, amplification, etc. In some embodiments, the processing circuitry 506 of the communication station 500 may include one or more processors. In some embodiments, two or more antennas 501 may be coupled to the physical layer circuitry 502 arranged for sending and receiving signals. The memory 508 may store information for configuring the processing circuitry 506 to perform operations for configuring and transmitting message frames and performing the various operations described herein. The memory 508 may comprise any type of memory, including non-transitory memory, for storing information in a form readable by a machine (e.g., a computer). For example, the memory 508 may comprise a computer-readable storage device may, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly.

In some embodiments, the communication station 500 may include one or more antennas 501. The antennas 501 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

Figure 6:
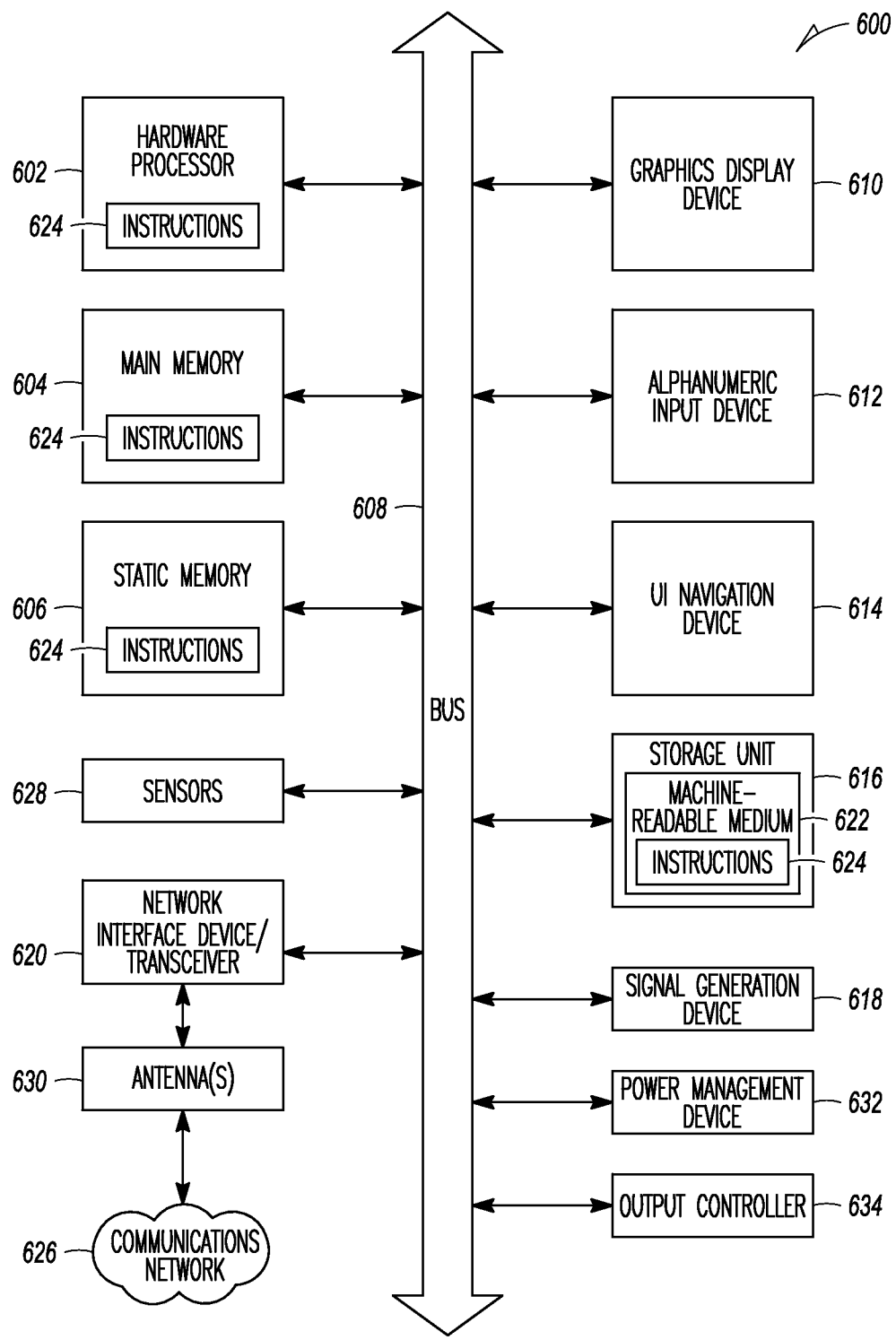
FIG. 6 shows a block diagram of an example of a machine upon which, any of one or more techniques (e.g., methods) discussed herein may be performed.

FIG. 6 illustrates a block diagram of an example of a machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612 and UI navigation device 614 may be a touch screen display. The machine 600 may additionally include a storage device (i.e., drive unit) 616, a signal generation device 618 (e.g., a speaker), a network interface device/transceiver 620 coupled to antenna(s) 630, and one or more sensors 628, such as a global positioning system (GPS) sensor, compass, accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible media to facilitate communication of such software.

In one embodiment, a UE comprising a processor and transceiver is configured to define an adaptation context, define a default and one or more additional acceptable QoS levels associated with the adaptation context, communicate a request to create or update an adaptive bearer specifying the defined adaptation context, default parameters and additional acceptable QoS levels, and receive or update spectrum resources for the adaptive bearer, the adaptive bearer provisioned according to the communicated request.

In another embodiment, a non-transitory computer readable storage device includes instructions stored thereon, which when executed by a machine, cause the machine to perform operations to define an adaptation context, define a default and one or more additional acceptable QoS levels associated with the adaptation context, communicate a request to create or update an adaptive bearer specifying the defined adaptation context and, default and additional acceptable QoS levels, and receive or update spectrum resources for the adaptive bearer, the adaptive bearer provisioned according to the communicated request.

In yet another embodiment, an Evolved Node B (eNB) is configured to receive an adaptation context, and a default and one or more additional acceptable QoS levels associated with the adaptation context generated by a network core entity, receive a directive to create or update an adaptive bearer according to the adaptation context and additional acceptable QoS levels, and allocate or update spectrum resources to a User Equipment (UE) for the adaptive bearer, the adaptive bearer provisioned according to the received directive.

And in another embodiment, a method for supporting adaptive Quality of Service (QoS) levels in wireless networks comprises enhancing signaling protocols between a User Equipment (UE) and an Application Function (AF) to indicate acceptable adaptive QoS levels, and conveying acceptable default and adaptive QoS level information between the UE and the AF using the enhanced signal protocols.

What is claimed is:

1. A User Equipment (UE) comprising: a processor; and transceiver, configured to:
   define an adaptation context;
   define a default QoS level and one or more additional acceptable QoS levels associated with the adaptation context;
   communicate a request to create or update an adaptive bearer specifying the defined adaptation context and the one or more additional acceptable QoS levels using different sets of QoS parameters; and
   receive or update spectrum resources for the adaptive bearer, the adaptive bearer remaining provisioned according to the communicated request throughout a pendency of the adaptive bearer when network resources change to alter a QoS level of the adaptive bearer between the default QoS level and the one or more additional acceptable QoS levels.

2. The UE of claim 1 further configured to define an adaptation context of "LICENSED_SHARED_ACCESS (0)," whose value indicates licensed shared access specific scenarios.

3. The UE of claim 1 further configured to define an enhanced QoS-Information Attribute Value Pair comprising an Adaptive-QoS-Level parameter.

4. The UE of claim 1 further configured to define an Adaptive-QoS-Level Attribute Value Pair (AVP) comprising an Adaptation Context parameter, a preference parameter, a QoS-Class-Identifier parameter, guaranteed upload and download bitrate parameters, an Allocation Retention Priority parameter, and an AVP for each additional acceptable QoS level.

5. The UE of claim 1 further configured to regard any dedicated bearer as an adaptive bearer by augmenting QoS parameters of a dedicated bearer with a set of adaptive QoS levels.

6. A non-transitory computer readable storage device including instructions stored thereon, which when executed by one or more processor(s) of a User Equipment (UE), cause the UE to perform operations to:
define an adaptation context;
define a default QoS level and one or more additional acceptable QoS levels associated with the adaptation context;
communicate a request to create or update an adaptive bearer specifying the defined adaptation context and the one or more additional acceptable QoS levels using different sets of QoS parameters; and
receive or update spectrum resources for the adaptive bearer, the adaptive bearer remaining provisioned according to the communicated request throughout a pendency of the adaptive bearer when network resources change to alter a QoS level of the adaptive bearer between the default QoS level and the one or more additional acceptable QoS levels.

7. The non-transitory computer readable storage device of claim 6 further including instructions thereon to define an adaptation context of "LICENSED_SHARED_ACCESS (0)," whose value indicates licensed shared access specific scenarios.

8. The non-transitory computer readable storage device of claim 6 further including instructions thereon to define an enhanced QoS-Information Attribute Value Pair comprising an Adaptive-QoS-Level parameter.

9. The non-transitory computer readable storage device of claim 6 further including instructions thereon to define an Adaptive-QoS-Level Attribute Value Pair (AVP) comprising an Adaptation Context parameter, a preference parameter, a QoS-Class-Identifier parameter, guaranteed upload and download bitrate parameters, an Allocation Retention Priority parameter, and an AVP for each additional acceptable QoS level.

10. The non-transitory computer readable storage device of claim 6 further including instructions thereon to regard any dedicated bearer as an adaptive bearer by augmenting QoS parameters of a dedicated bearer with a set of adaptive QoS levels.

11. An Evolved Node B (eNB) comprising hardware processing circuitry configured to:
receive an adaptation context, and a default QoS level and one or more additional acceptable QoS levels associated with the adaptation context generated by a network core entity;
receive a directive to create or update an adaptive bearer according to the adaptation context and the one or more additional acceptable QoS levels using different sets of QoS parameters; and
allocate or update spectrum resources to a User Equipment (UE) for the adaptive bearer, the adaptive bearer remaining provisioned according to the received directive throughout a pendency of the adaptive bearer when network resources change to alter a QoS level of the adaptive bearer between the default QoS level and the one or more additional acceptable QoS levels.

12. The eNB of claim 11 further configured to receive an adaptation context of "LICENSED_SHARED_ACCESS (0)," whose value indicates licensed shared access specific scenarios.

13. The eNB of claim 11 further configured to receive an enhanced QoS-Information Attribute Value Pair comprising an Adaptive-QoS-Level parameter.

14. The eNB of claim 11 further configured to receive an Adaptive-QoS-Level Attribute Value Pair (AVP) comprising an Adaptation Context parameter, a preference parameter, a QoS-Class-Identifier parameter, guaranteed upload and download bitrate parameters, an Allocation Retention Priority parameter, and an AVP for each additional acceptable QoS level.

15. The eNB of claim 11 further configured to create or update the adaptive bearer by augmenting QoS parameters of a dedicated bearer with a set of adaptive QoS levels.

16. The eNB of claim 11 wherein:
at least one of the one or more additional acceptable QoS levels specifies licensed shared access (LSA) as an adaptation context, and
the eNB is further configured to:
receive an indication of reclamation of LSA spectrum; and
mitigate resource shortages caused by LSA spectrum reclamation by adjusting a QoS level of the adaptive bearer to the at least one of the one or more additional acceptable QoS levels that use different sets of QoS parameters.

17. The eNB of claim 16 further configured to:
receive additional LSA spectrum after downgrading the adaptive bearer; and
prioritize an upgrade of the QoS level of the adaptive bearer previously downgraded due to a previous LSA reclamation.

18. The eNB of claim 11 wherein:
at least one of the one or more additional acceptable QoS levels specifies licensed shared access (LSA) as an adaptation context, and
the eNB is further configured to admit the adaptive bearer based on supportability of the adaptive bearer when LSA spectrum is reclaimed due to the at least one of the one or more additional acceptable QoS levels.

19. The eNB of claim 11 further configured to:
track current QoS levels provided to the adaptive bearer and update a mobility management entity (MME) whenever the QoS level of the bearer is adapted.

* * * * *